(12) United States Patent
Dohrmann

(10) Patent No.: US 6,259,041 B1
(45) Date of Patent: Jul. 10, 2001

(54) ONBOARD INDICATOR FOR MEASURING THE WEIGHT OF VEHICLES

(76) Inventor: David K. Dohrmann, 11 N. Valley Pride Rd., South Hutchinson, KS (US) 67505

( * ) Notice: Subject to any disclaimer, the term of this patent is extended or adjusted under 35 U.S.C. 154(b) by 0 days.

(21) Appl. No.: 09/336,408

(22) Filed: Jun. 18, 1999

(51) Int. Cl.$^7$ ................................................ G01G 19/08
(52) U.S. Cl. ............................................. 177/136; 177/137
(58) Field of Search .................................. 177/136, 137, 177/138, 139, 141

(56) References Cited

U.S. PATENT DOCUMENTS

| | | | |
|---|---|---|---|
| 3,648,790 | 3/1972 | Bishop | 177/137 |
| 3,857,093 | 12/1974 | Green | 324/65 R |
| 3,889,767 | * 6/1975 | Scott et al. | 177/136 |
| 3,955,636 | 5/1976 | Askew | 177/137 |
| 4,106,579 | * 8/1978 | Hayes, Sr. et al. | 177/137 |
| 4,384,628 | * 5/1983 | Jackson | 177/137 |
| 4,623,029 | 11/1986 | Bambauer et al. | 177/137 |
| 4,756,374 | * 7/1988 | Bailey et al. | 177/137 |
| 4,789,033 | 12/1988 | Dohrmann | 177/137 |
| 5,410,109 | * 4/1995 | Tarter et al. | 177/136 |
| 5,522,468 | 6/1996 | Dohrmann et al. | 177/136 |
| 5,844,474 | * 12/1998 | Saling et al. | 177/137 |

* cited by examiner

Primary Examiner—Randy W. Gibson
(74) Attorney, Agent, or Firm—Shook, Hardy & Bacon L.L.P.

(57) ABSTRACT

An onboard process indicator is provided for measuring the load applied to an axle which is coupled to a vehicle. The onboard weight indicator includes a pivoting beam that is mounted to an axle of the vehicle. The pivoting beam is mounted so that it pivots about a point called the roll-center, which is the center of the suspension. The pivoting beam is also coupled to a transducer and a vertical support. The vertical support and transducer can be located on opposite sides of the roll-center with respect to one another or can be located on the same side of the roll-center. The vertical support and transducer are coupled between the pivoting beam and the frame rail of the vehicle. As a load is applied to the vehicle, the frame rail thereof is moved downwardly. This downward movement is measured by the transducer, which communicates the measured load to a processor. The processor translates the signal from the transducer into process units, and displays this as desired units.

10 Claims, 2 Drawing Sheets

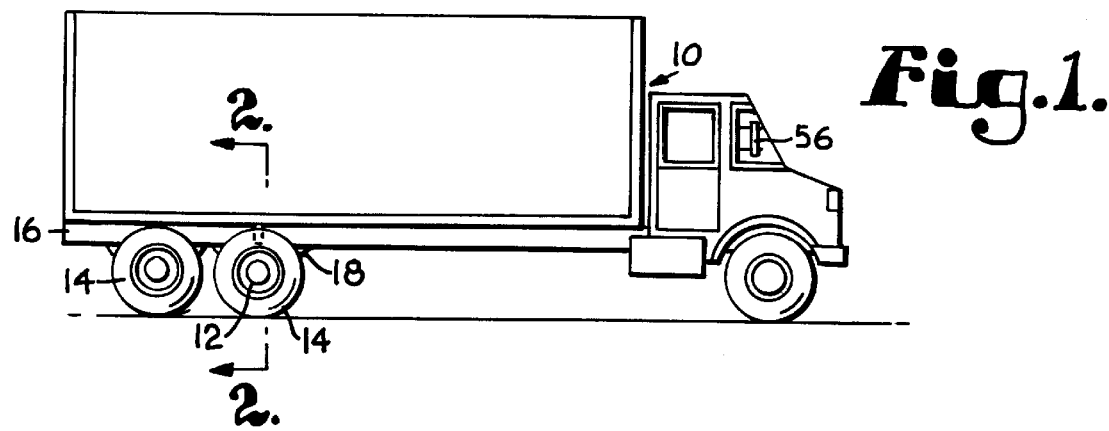
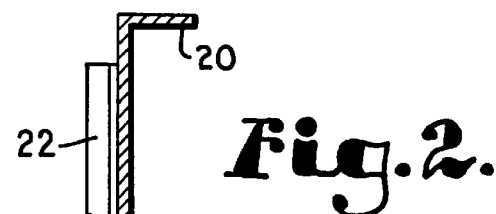
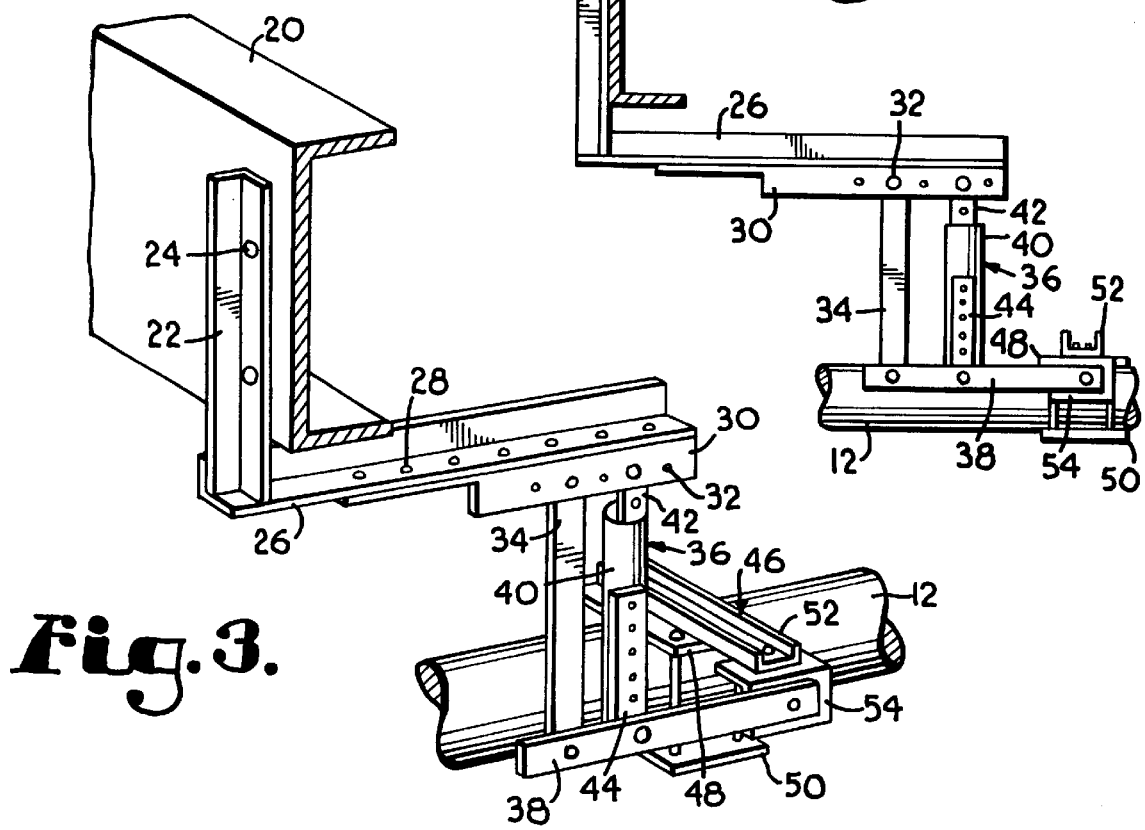

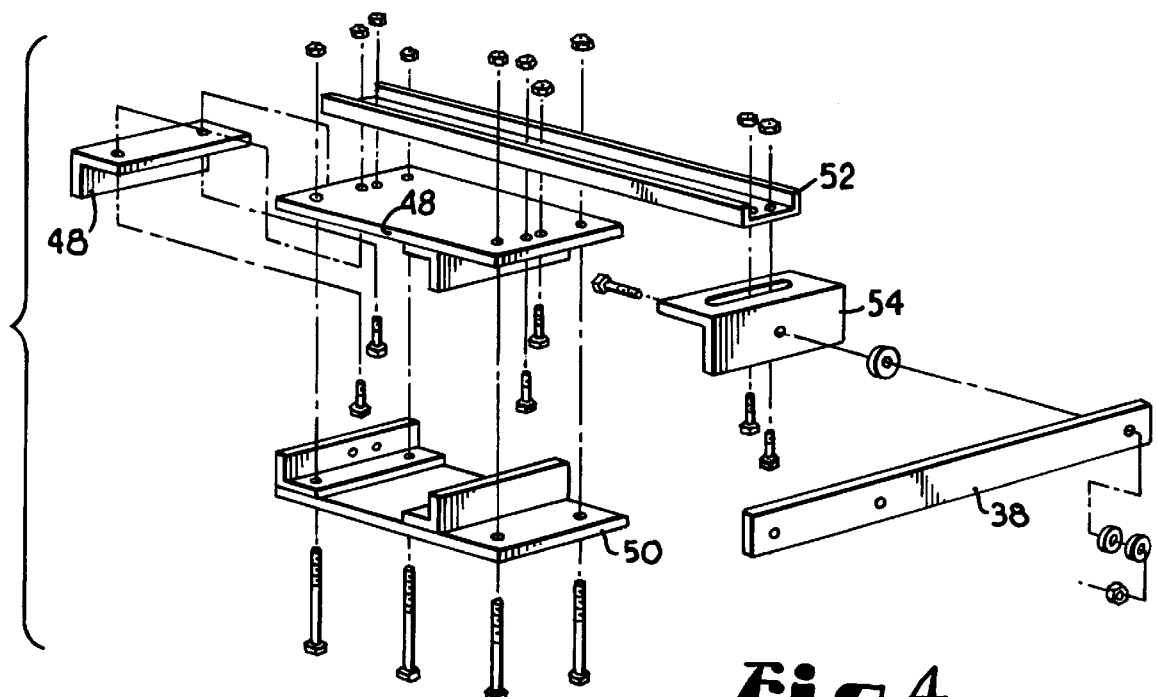
Fig.4.
Fig.5.
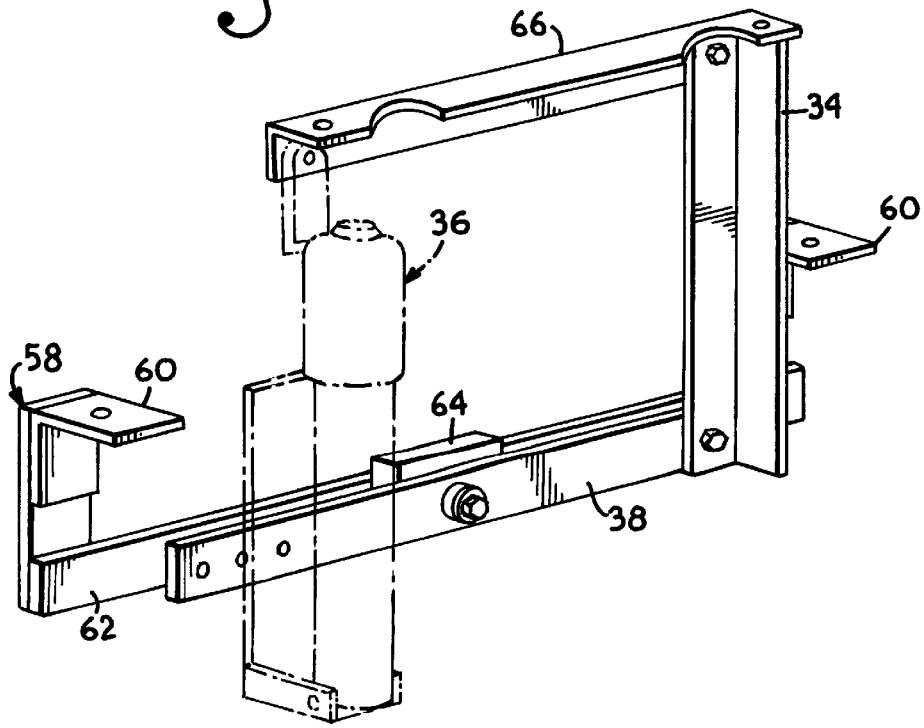

ONBOARD INDICATOR FOR MEASURING THE WEIGHT OF VEHICLES

STATEMENT REGARDING FEDERALLY SPONSORED RESEARCH OR DEVELOPMENT

Not Applicable.

CROSS-REFERENCE TO RELATED APPLICATIONS

Not Applicable.

BACKGROUND OF THE INVENTION

This invention relates in general to weight measuring devices. More particularly, the invention relates to an onboard weight indicator for measuring the weight of a vehicle.

Onboard weight indicators such as shown in U.S. Pat. Nos. 3,648,790, 3,857,093, 3,955,636, and 4,623,029 are used to determine the weight of a load applied to a vehicle. Indicators of this type generally operate by measuring the deflection of the vehicle springs and then correlating the deflection with a known or calculated weight of the vehicle. A transducer is typically used to measure the spring deflection and a signal is then sent from the transducer to a suitable processor unit which calculates and displays the vehicle weight. These types of onboard weight indicators are particularly advantageous because they allow the vehicle load to be determined while the vehicle is being loaded and without requiring that the vehicle be positioned on a stationary scale.

Many of these conventional types of onboard weight indicators are mounted at opposite ends of each axle on the vehicle. Because of the costs associated with the transducers or other weight sensing portions of the weight indicators, a weight indicator was disclosed in U.S. Pat. No. 4,789,033 which allows a single transducer to be mounted between the tandem axles of a vehicle. This mounting arrangement allows the single transducer to be used to measure the load applied to a set of tandem axles. As a result, significant cost savings can be achieved in comparison to other weighing systems which require that a weight indicator be positioned at each end of every axle on the vehicle. Moreover, a system utilizing two transducers does not accurately account for certain types of movement. More specifically, such a system is not equipped to account for side to side movement of the vehicle, or loading of a vehicle on uneven ground. This is important because vehicles, especially trucks, encounter situations where they are carrying an uneven load, or are on an uneven road.

When using a single weight indicator to measure the deflection of tandem axles, it is important that the transducer be vertically oriented at a central position between the axles. When positioned in this manner, the transducer functions like a fulcrum and more accurately averages the movement experienced by both axles. Similarly, when one indicator is used on a single axle, the associated transducer should be centrally positioned between the ends of the axle to average the load applied to the axle. Often, however, the drive train or components of the vehicle frame interfere with the desired positioning of the transducer on tandem and single axle vehicles. The transducer must then be positioned off-center, with resulting inaccuracies in the measurement of a load applied to the axles. A need thus arose for an onboard weight indicator which allowed a single transducer to be mounted off-center and still maintain a more accurate averaging of the load applied to a single or tandem axle.

U.S. Pat. No. 5,522,468 disclosed an apparatus that addressed the above-identified need. The apparatus used an averaging arm that created a hole that monitored the average spring deflection in a suspension. The apparatus, however, used a somewhat complicated mechanical structure that spanned the distance between the two side rails of the truck, or spanned the distance between each of the axles of a tandem axle vehicle. Such a construction is complicated and relatively expensive to make and install properly on a vehicle. Moreover, such a construction often involved a corresponding movement of the transducer to the movement of the vehicle frame rail. Movements of this length can adversely affect the overall life of the transducer used.

Therefore, an apparatus is needed that overcomes the above drawbacks and disadvantages existing in the prior art. More specifically, an onboard weight indicator is needed that can accurately determine the weight of a vehicle and that is easily mounted to the vehicle without interference from the drive train thereof.

SUMMARY OF THE INVENTION

It is therefore an objection of the present invention to provide an onboard weight indicator in which the sensor can be mounted at an off-center position but can still operate to determine the load applied to a single or tandem axle so that an accurate measurement can be obtained despite, placement of the sensor at an off-center position.

It is another object of the invention to provide an onboard weight indicator which uses a single weight sensor to determine the load applied to a single or tandem axles so that multiple sensors are not required and which also allows the sensor to be located at positions other than a center point while still providing an accurate measure of the weight applied to the single or tandem axles.

It is yet another object of the present invention to provide an onboard weight indicator that can be mounted in an off-center position but can still accurately determine the weight applied to a single or tandem axle and that is of a relatively simple construction and easily mountable to the vehicle.

To accomplish these and other related objects, an onboard weight indicator is provided for measuring the load applied to an axle which is coupled to a vehicle. The onboard weight indicator includes a pivoting beam that is mounted to an axle of the vehicle. The pivoting beam is mounted so that it pivots about a point called the roll-center, which is the center of the suspension. The pivoting beam is also coupled to a transducer and a vertical support. The vertical support and transducer can be located on opposite sides of the roll-center with respect to one another or can be located on the same side of the roll-center. The vertical support and transducer are coupled between the pivoting beam and the frame rail of the vehicle. As a load is applied to the vehicle, the frame rail thereof is moved downwardly. This downward movement is measured by the transducer, which communicates the measured load to a processor. The processor translates the signal from the transducer into a weight, and displays this weight.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a side elevation view of a truck having the onboard weight indicator of the present invention mounted thereto;

FIG. 2 is an enlarged partial cross-sectional view taken along line 2—2 of FIG. 1;

FIG. 3 is a partial perspective view of the weight indicator shown in FIG. 2;

FIG. 4 is an exploded view of an alternate embodiment of the weight indicator of the present invention; and FIG. 5 is a perspective view of the embodiment shown in FIG. 4 in an assembled state with the transducer shown in phantom lines.

DETAILED DESCRIPTION OF THE PREFERRED EMBODIMENT

Referring now to the drawings in greater detail, and initially to FIG. 1, a truck employing an onboard weight indicator is represented by the numeral 10. Truck 10 includes a rear tandem axle 12 which mounts wheels 14 in a conventional manner. The rear axle 12 is coupled with a covered bed 16 of the truck by a conventional suspension system 18. It should be noted that the invention of the present invention works equally well on vehicles with a single rear axle, or front axles or on tandem axles.

Turning now to FIG. 2, a frame rail 20 is shown that is one of two frame rails of the bed 16. Frame rail 20 has coupled thereto a vertical brace 22, which is preferably a piece of angle iron, although other rigid structural members would also be suitable. Brace 22 is coupled to rail 20 with a pair of bolts 24. A frame mounting rail 26 is rigidly coupled to the lower end of brace 22, such as by welding. As best seen in FIG. 3, rail 26 extends inwardly towards the center of bed 16 and includes a series of spaced mounting holes 28 along the length thereof.

A second angle 30 is coupled to rail 26 by placing bolts through slots provided in angle 30 that align with the holes 28 in rail 26. The provision of a series of holes 28, along with the slots in angle 30 allows the relative position of rail 26 to angle 30 to be adjusted. Angle 30 has a second set of holes 32 extending generally horizontally therethrough. Holes 32 are used to mount a vertical support 34 and a transducer 36 to angle 30. More specifically, a support 34 is pivotally mounted on its upper end to angle 30 with a bolt, rivet or other suitable attaching mechanism. Preferably, a washer is placed between the bolt and the angle 30 on one side. On the opposite side of angle 30, a rubber cushion is positioned between the angle 30 and the connecting nut for the bolt. The rubber cushion prevents over tightening of the bolt, so that support 34 is allowed to freely pivot. The lower end of support 34 is pivotally coupled to a pivoting beam 38 in much the same manner.

As best seen in FIGS. 2 and 3, in this embodiment, transducer 36 is located inwardly from support 34, and is pivotally coupled between angle 30 and beam 38 in much the same manner as support 34. The actual transducer is coupled to angle 30 with a connecting arm 42 and is slidingly held within a protective sleeve 40. Sleeve 40 is coupled to pivoting beam 38 with a second arm 44. Arm 44 is provided with a series of mounting holes 46 that allow the vertical position of arm 44 to be adjusted relative to beam 38. Such adjustment may be necessary to obtain the desired readings from transducer 36. Transducer 36 is electrically coupled to a processor which translates the signal received from the transducer into a readable indication of units, such as weight or liquid volume, which is then displayed within the cab of truck 10.

In the embodiment shown in FIGS. 2 and 3, the end of beam 38 opposite support 34 is pivotally coupled to axle 12 with a mounting bracket 46. As best seen in FIGS. 3 and 4, bracket 46 includes a top plate 48 and a bottom plate 50 that are bolted to one another and about axle 12. Top plate 48 has an extending member 52 bolted thereto that extends outwardly beyond plate 48. Member 52 operates to space the pivot point away from axle 12 so that beam 38 extends generally parallel to axle 12. Member 52 has an angled connector 54 coupled thereto. Connector 54 is coupled between member 52 and beam 38. It should be noted that other methods for attaching beam 38 to axle 12 would also be suitable, including spacing beam 38 from axle 12 and bolting it thereto.

From the above arrangement, it can be seen that as a load is applied to truck 10, frame rail 20 will lower in response to the weight. As frame rail 20 lowers, support 34 forces the end of pivoting beam 38 downwardly. This, in turn, causes arm 44 and to lower. The extent of this lowering is measured by transducer 36 and transmitted to the processor and display 56 so that the applied load is indicated to the user of truck 10. The above arrangement allows the transducer to be mounted away from the mid-point of the suspension and nearer to the frame rails of the truck. The slots within angle 30 and the holes 28 in frame 26 allow transducer 36 and vertical support to be mounted in a parallel relationship, wherein transducer 36 and support 34 are vertically oriented. Such an arrangement allows predrilling of mounting holes and accurate positioning of transducer 36 and support 34. This, in turn, allows accurate readings to be obtained even when the vehicle is unevenly loaded or is upon uneven ground. Moreover, while the above description has detailed a rear axle mounting, the above described invention could also be mounted on the front axle or a trailer suspension of a trailer as well.

Importantly, the mounting bracket 46 should be located so that beam 38 pivots about the roll-center of the vehicle on which it is mounted. To find the vehicle roll-center or the point at which the springs of the suspension system act through a single point, the processor and display 56 are turned on, and the vehicle is loaded. Each wheel is rolled over an elevation, such as a piece of lumber. The change in the display is then noted as the truck is rolled on and off of the elevation. If the display value changes as one side of the vehicle is rolled over the elevation, then the pivoting beam 38 is not positioned to pivot about the roll-center. Bracket 46 is then moved and the vehicle is again rolled over the elevation. This process is continued until no change is noticed in the display as the vehicle is rolled onto and off of the elevation. With bracket 46 positioned so that beam 38 pivots about the roll-center, accurate weight measurement will be obtained even when one side of truck 10 is loaded more heavily than the other side. With transducer 36 and support 34 vertically mounted and parallel to one another, accurate readings will be obtained both when up and down movement is encountered, and when side to side movement is encountered.

An alternate embodiment of the invention is shown in FIG. 5. In this embodiment, the transducer is located on the opposite side of pivoting beam 38 with respect to support 34. The transducer 36 must therefore be positioned to measure changes slightly differently, such that when support 34 forces the end of beam 38 downwardly, the opposite end, to which transducer 36 is coupled, will move upwardly. This arrangement allows the transducer to monitor smaller changes in movement of the frame rail 26.

More specifically, in the embodiment shown in FIG. 5, a mounting bracket 58 is used to support pivoting beam 38. Bracket 58 is mounted so that it extends across the truck, in parallel to the axle of the truck. Bracket 58 includes a pair of mounts 60 which support a horizontal bar 62. Pivoting beam 38 is pivotally coupled to bar 62, with the pivot point thereof located at the roll-center of the truck, with a suitable attaching mechanism, such as by bolting. A spacer 64 is placed between bar 62 and beam 38.

As with the previous embodiment, a vertical support 34 extends from beam 38 to an angle support 66. This angle support 66 is rigidly secured to the truck bed 16, such as by welding or bolting it to the frame rail 20 of the truck. Support 66 also extends inwardly a sufficient distance past the pivot point of beam 38. The end of support 66 distal from support 34 has a transducer 36 coupled thereto. Transducer 36 is thus mounted on one end to support 66, and on the other end to beam 38. As with the previous embodiment, transducer 36 and support 66 are mounted vertically and in parallel relation to one another.

In this embodiment, transducer 36 functions slightly differently due to its positioning. As weight is placed onto truck bed 16, frame rail 20 will lower. This forces support 34 downwardly, which in turn forces the end of beam 38 to which it is attached downwardly. Beam 38 thus pivots about the roll-center of the truck, forcing the end of beam 38 to which transducer 36 is attached upwardly. This upward movement is measured by the transducer and is communicated to the processor and display unit 56, where the signal is displayed as a load or weight.

In both embodiments disclosed above, the transducer is located away from the midpoint of the vehicle, which allows the device to accurately determine the load of the vehicle while still being relatively easy to mount to the vehicle. Further, due to the above-disclosed linkage arrangements, the transducer will experience less movement than experienced by the frame of the vehicle. This increases the life or longevity of the transducer used. Finally, both embodiments provide accurate measurements in spite of an unlevel load, or an unlevel road.

From the foregoing, it will be seen that this invention is one well adapted to attain all of the ends and objects hereinabove set forth, together with other advantages which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The following is claimed:

1. An onboard load indicator for a vehicle having at least one axle and a vehicle frame, comprising:

a pivoting beam that is mounted to an axle of the vehicle;

a support structure mounted to the frame of the vehicle;

a vertical support coupled between said support structure and said pivoting beam, so that a downward movement in said frame is communicated through said vertical support; and a transducer mounted between said pivoting beam and said support structure, said transducer mounted to said beam measuring the movement of said pivoting beam, wherein as a load is placed on said vehicle, said frame is forced downwardly, said downward movement communicated to said pivoting beam through said vertical support, said transducer measuring said movement of said pivoting beam.

2. The onboard weight indicator of claim 1, further comprising a processor display unit electrically coupled to said transducer, said processor display unit converting and displaying the signal received from said transducer into a readable process units.

3. The onboard weight indicator of claim 2, wherein said pivoting beam is mounted so that it pivots about the roll-center of the vehicle.

4. The onboard weight indicator of claim 3, wherein said pivoting beam is mounted with said roll-center between said transducer and said vertical support.

5. The onboard weight indicator of claim 3, wherein said pivoting beam is mounted with said transducer between said vertical support and said roll-center.

6. An onboard weight indicator for a vehicle having at least one axle and a vehicle frame, comprising:

a pivoting beam pivotally coupled to said vehicle adjacent said at least one axle;

a support structure mounted to the frame of the vehicle;

a vertical support coupled between said support structure and said pivoting beam; and a transducer coupled between said beam and said support structure, said transducer measuring the movement of said pivoting beam, wherein as a load is placed on said vehicle, said frame is forced downwardly, said downward movement communicated to said pivoting beam through said vertical support, said transducer measuring said movement of said pivoting beam.

7. The onboard weight indicator of claim 6, further comprising a processor display unit electrically coupled to said transducer, said processor display unit converting and displaying the signal received from said transducer into a readable weight units.

8. The onboard weight indicator of claim 7, wherein said pivoting beam is mounted so that it pivots about the roll-center of the vehicle.

9. The onboard weight indicator of claim 8, wherein said pivoting beam is mounted with said roll-center between said transducer and said vertical support.

10. The onboard weight indicator of claim 8, wherein said pivoting beam is mounted with said transducer between said vertical support and said roll-center.

* * * * *